United States Patent [19]
Jolson

[11] Patent Number: 5,658,688
[45] Date of Patent: Aug. 19, 1997

[54] LITHIUM-SILVER OXIDE BATTERY AND LITHIUM-MERCURIC OXIDE BATTERY

[75] Inventor: Joseph D. Jolson, Pittsburgh, Pa.

[73] Assignee: Mine Safety Appliances Company, Pittsburgh, Pa.

[21] Appl. No.: 592,247

[22] Filed: Jan. 26, 1996

Related U.S. Application Data

[63] Continuation of Ser. No. 235,377, Apr. 29, 1994, abandoned.
[51] Int. Cl.$^6$ .................................................. H01M 4/54
[52] U.S. Cl. .......................... 429/194; 429/144; 429/192; 429/219
[58] Field of Search .................................. 429/194, 195, 429/192, 197, 219

[56] References Cited

U.S. PATENT DOCUMENTS

| | | |
|---|---|---|
| 3,055,964 | 9/1962 | Solomon et al. |
| 3,772,083 | 11/1973 | Mead .................................. 429/219 |
| 3,853,627 | 12/1974 | Lehmann et al. ...................... 429/48 |
| 3,877,993 | 4/1975 | Davis .................................. 429/144 |
| 3,947,289 | 3/1976 | Dey et al. |
| 4,167,609 | 9/1979 | Scarr .................................. 429/206 |
| 4,310,609 | 1/1982 | Liang et al. .......................... 429/194 |
| 4,423,124 | 12/1983 | Dey .................................... 429/194 |
| 4,555,454 | 11/1985 | Shuster ................................ 429/51 |
| 4,812,375 | 3/1989 | Foster ................................ 429/101 |
| 5,320,916 | 6/1994 | Kishimoto et al. .................... 429/142 |

FOREIGN PATENT DOCUMENTS 2299733  8/1976  France.

OTHER PUBLICATIONS

Derwent Publications Ltd. AN 81–57604D & JP-A-56 073 861 (Sango Electric KK) Nov. 1979.
Proceedings of the 8th Annual Power Sources Conference J. Farrar et al., "High-Energy Battery System Study", 1964.
Final Report on US Army Contract #DA-36-039-AMC-03201 by J. Farrer et al. for "High-Energy Battery System Study", 1963.
Electrochemical Technology, Jan.–Feb. 1968, R. Jasinski, "Electrochemical Power Sources in Nonaqueous Solvents".

*Primary Examiner*—Stephen Kalafut
*Attorney, Agent, or Firm*—James G. Uber

[57] ABSTRACT

An active primary battery containing a lithium anode; an aprotic organic electrolyte; a separator; and a cathode made of silver (II) oxide, mercuric oxide, or a mixture of silver (II) oxide and mercuric oxide is described. The battery exhibits high open circuit and operating voltage under a wide range of current densities. The open circuit voltage of a lithium-silver (II) oxide battery of the present invention is almost double that obtained in a zinc-silver (II) oxide battery. The packaged capacity density, in amp-hrs/cc, is about twice that obtained in a lithium-manganese dioxide battery or a lithium-iodine battery. The packaged energy density, in watt-hours/cc, is also about twice that obtained in a zinc-silver (II) oxide battery, a lithium-manganese dioxide battery, and a lithium-iodine battery.

17 Claims, 8 Drawing Sheets

LITHIUM-SILVER OXIDE BATTERY AND LITHIUM-MERCURIC OXIDE BATTERY

This application is a continuation of application Ser. No. 08/235,377 filed on Apr. 29, 1994 now abandoned.

FIELD OF THE INVENTION

The present invention relates to active primary batteries, and more particularly, to primary lithium batteries which have solid cathodes and organic electrolytes. Such batteries are often used as the power source in implantable medical devices such as pacemakers.

BACKGROUND OF THE INVENTION

Active primary batteries are a well known type of primary battery which do not require activation before use. Therefore, their power can be delivered instantly on demand. These batteries are useful in applications requiring low to moderate current densities. They typically operate over a temperature range extending from about −20° C. to +60° C. Shelf life for these batteries is given in years unless storage temperatures become excessively elevated above ambient.

One important class of active primary batteries utilizes a zinc anode, a caustic aqueous electrolyte, and a solid cathode made of manganese dioxide, silver (II) oxide ("AgO"), or mercuric oxide ("HgO"). These batteries generally develop a potential of about 1.5 volts. They have good power density and work over a reasonable temperature range. The packaged volumetric energy density of the zinc-manganese dioxide system is not very high; however, the packaged energy density of the zinc-mercuric oxide system is significantly higher. The packaged volumetric energy density of the zinc-silver (II) oxide system is about twice that of the zinc-manganese dioxide system primarily because of the excellent amp-hr capacity of silver (II) oxide.

A second important class of active primary batteries utilizes a lithium anode, an aprotic organic electrolyte, and a solid cathode made of manganese dioxide. These batteries typically develop a potential of about 3.0 volts. They have good power density and work over a reasonable temperature range. The packaged volumetric energy density of the lithium-manganese dioxide system is about twice that of the zinc manganese-dioxide system primarily because of the high potential developed by the lithium anode.

There is a third class of active primary batteries which are solid state in nature. An example of such an active primary battery is the lithium-iodine battery. It develops a potential of about 2.8 volts and has a packaged volumetric energy density somewhat above that of the zinc-silver (II) oxide and lithium-manganese dioxide couples. However, the lithium-iodine couple can only be used to power low rate devices such as implantable pacemakers and electronic watches.

U.S. Pat. No. 3,853,627 mentions in passing that known cells include those with lithium anodes, non-aqueous electrolytes, and a silver oxide cathode. U.S. Pat. No. 4,167,609 theorizes constructing a battery with a lithium anode, a silver (II) oxide cathode, and a compatible non-aqueous electrolyte but never indicates what nonaqueous electrolyte is compatible with both lithium and silver (II) oxide. U.S. Pat. No. 4,555,454 mentions in passing that one can combine a lithium anode, a silver (II) oxide cathode, and an aqueous or non-aqueous electrolyte to form a battery. None of these patents, however, demonstrate that such a combination is really possible, has been made, or what non-aqueous electrolyte could be used if it was possible.

The first report in the literature on the lithium-silver (II) oxide system in non-aqueous media is described in the Proceedings of the 8th Annual Power Sources Conference, Atlantic City, N.J. May 19–21, 1964. The paper by J. Farrar, R. Keller, and C. J. Mazac describes experiments performed to determine pairs of anodes and cathodes which could be used to provide high energy density in organic electrolytes. The authors concluded that the lithium-silver (II) oxide couple with an electrolyte composed of LiBr in dimethyl sulfoxide did not perform as well as the lithium-manganese dioxide couple.

A second report describing work with the lithium-silver (II) oxide system in non-aqueous media is dated Nov. 1, 1965 and is the final report on U.S. Army Contract #DA-36-039-AMC-03201 and covers the work period from Jul. 1, 1963 to Jun. 30, 1965. It was written by J. Farrar, R. Keller and M. M. Nicholson and concludes that lithium is the preferred anode material, propylene carbonate is the preferred electrolyte solvent, and BrCN, $CuCl_2$, and $CuF_2$ are preferred cathode materials. Silver (II) oxide was described as performing poorly even compared to $MnO_2$ which was not one of the preferred cathode materials tested.

A third report was written by R. Jasinski and published in Electrochemical Power Sources, 6, 28 (1968). The paper reviews progress in the field of high energy density batteries in relation to the goal of developing a system which delivers twice the energy density of the aqueous caustic zinc-silver oxide system. Jasinski provides a list of proposed reaction mechanisms and theoretical energy densities for electrode couples which could meet this goal. He included the lithium-silver (II) oxide couple on this list but never describes a nonaqueous electrolyte for this system. Jasinski also did not include the lithium-silver (II) oxide system in his description of promising systems.

Japanese Patent Application #55-111075 dated Feb. 21, 1979 describes the use of gelled organic electrolytes in lithium batteries using various solid cathodes. Although most of the work was done with other types of cathodes, a brief description of a lithium-silver (II) oxide battery with a gelled gamma-butyrolactone based electrolyte is shown in Table I. Using gamma-butyrolactone as the non-aqueous electrolyte with a lithium anode and silver (II) oxide cathode is not satisfactory because it provides poor discharge and storage results since the gamma-butyrolactone is unstable in this system.

From this review of the literature it can be seen that a useable battery with a lithium anode, a silver (II) oxide and/or mercuric oxide cathode, and a non-aqueous electrolyte has not been made because the experimental results reported in the literature are far inferior to the theoretical parameters which are summarized hereinafter.

The free energy of formation ($\Delta G°$) of AgO, HgO, $Li_2O$, and LiI, as taken from the 70th Edition of the Handbook of Chemistry and Physics, are:

| Substance | $\Delta G°$ (kcal/mole) |
| --- | --- |
| AgO | 3.3 |
| HgO | −13.995 |
| $Li_2O$ | −134.13 |
| LiI | −64.60 |

The probable power generating reactions occurring in the lithium-silver (II) oxide, lithium-mercuric oxide, and lithium-iodine cells, along with the electromotive force, (E°) generated by these reactions, are:

| | |
|---|---|
| 2Li + AgO → Li$_2$O + Ag | E° = 2.980 volts |
| 2Li + HgO → Li$_2$O + Hg | E° = 2.605 volts |
| 2Li + I$_2$ → 2LiI | E° = 2.801 volts |

The free energy information allows the calculation of $\Delta G°$ for the reactions shown above. Knowledge of $\Delta G°$; n, the number of electrons transferred in the reaction of interest; and F, Faraday's constant; allows calculation of E°, the electromotive force, for the reactions shown above using the formula:

$$E° = -\Delta G°/nF$$

The volumetric capacity of an electrode material can be calculated from the formula:

$$\text{Amp-hrs/cc} = (\text{amp-hrs/eq})\ (\text{eq/mole})\ (\text{gms/cc})/(\text{gms/mole})$$

where amp-hrs/eq is (96,487 coul/eq)/(3,600 coul/amp-hr) and eq/mole is 1 for lithium and 2 for AgO, HgO, and I$_2$. Density in gms/cc and molecular weight in gms/mole are taken from the 70th Edition of the Handbook of Chemistry and Physics or the 12th Edition of Lange's Handbook of Chemistry and are shown below along with the calculated capacity for lithium, silver oxide, mercuric oxide, and iodine.

| Substance | eq/mole | Density (gms/cc) | Mol Weight (gms/mole) | Capacity (amp-hrs/cc) |
|---|---|---|---|---|
| AgO | 2 | 7.44 | 123.87 | 3.22 |
| HgO | 2 | 11.14 | 216.59 | 2.75 |
| I$_2$ | 2 | 4.93 | 253.81 | 1.04 |
| Li | 1 | 0.534 | 6.94 | 2.06 |

The volumetric energy density for a battery couple, assuming theoretical cathode density, no separator, and no packaging, can be calculated from the equation:

$$\text{watt-hrs/cc} = (E°)/\{(1/\text{amp-hrs/cc anode}) + (1/\text{amp-hrs/cc cathode})\}$$

Solving this equation for the couples of interest provides the data shown in the table below:

| Couple | Energy Density (watt-hrs/cc) |
|---|---|
| Li—AgO | 3.75 |
| Li—HgO | 3.07 |
| Li—I$_2$ | 1.94 |

Similarly, the gravimetric energy density of the lithium-silver (II) oxide, lithium mercuric oxide, and lithium-iodine couples can be calculated to be 1,153, 0,604, and 0,560 amp-hrs/gm respectively.

This theoretical information, and therefore the attractiveness of devising a useable lithium-silver (II) oxide and/or lithium-mercuric oxide battery is probably why such couples have been mentioned before in the literature. However, prior attempts to develop a commercially viable or vene a workable lithium-silver (II) oxide battery have been unsuccessful for any number or reasons including the improper choice of electrolytes, the use of unacceptable separators, the use of cell components with unacceptably high levels of impurities, and/or an insufficient understanding of cathode characteristics. It would be desirable therefore to provide a workable and commercially viable high energy density lithium-silver (II) oxide and/or lithium-mercuric oxide battery.

SUMMARY OF THE INVENTION

Generally the present invention relates to an active primary battery comprising: a housing; a lithium anode; a cathode made from the group comprising silver (II) oxide, mercuric oxide, or a mixture of silver (II) oxide and mercuric oxide; an aprotic organic electrolyte which is reasonably stable to reduction by the anode and oxidation by the cathode; and a separator system which maintains the anode electrically separate from the cathode but allows for ionic transport between the anode and cathode.

In one embodiment, the housing consists of a case and cover blank made of 304L stainless steel, or other material, which resists corrosion. A suitable glass-to-metal seal can be obtained by glassing Fusite 435 glass, or equivalent, to the cover blank with a 446 stainless steel pin projecting through the center of the glass. The 446 stainless steel pin is typically connected to an anode current collecting screen. Lithium strips are placed on opposite faces of the screen and swaged together sealing the screen within the lithium.

The lithium is covered with a separator, preferably one made of several layers. The separator maintains the anode and cathode electrically isolated but allows ionic contact to be maintained between the two electrodes. The separator also must keep dissolved or suspended species, such as $Ag^{+2}$ and/or AgO, from migrating from the cathode to the anode. Generally, one or more layers of microporous membranes function satisfactorily as separators. However, semipermeable membranes, among others, may also be used as one or more of the separator layers. To make sure the separators are able to perform their function properly special wrapping and/or sealing techniques, including heat sealing and ultrasonic bonding, of the separator edges can be used.

Preferably, a cathode of the present invention is prepared from thermally stabilized silver (II) oxide (AgO). For optimum energy density only the minimum void volume necessary to obtain efficient utilization of the cathode material at the desired drain rate should be left in the pelletized cathode. Small amounts of PTFE, or other binder, may be used to improve pelletization of the AgO. Small amounts of a conductive additive can also be mixed with the AgO to improve initial voltage under heavy drain rates.

When HgO is used as the cathode active material, conductive additives such as carbon black and silver powder should be used to assure satisfactory cathode conductivity. These conductive additives also bind the mercury produced as the cathode reduces. Because silver amalgamates with mercury it is better than carbon black at keeping mercury from shorting the battery and is preferred for this purpose. Because HgO discharges at a somewhat lower potential than AgO, AgO should reduce first in a cathode composed of a mixture of AgO and HgO. Therefore, the silver produced as the AgO discharges can be used to bind the mercury produced as the HgO discharges. This eliminates the need for using a separate conductive additive with cathodes made of a mixture of AgO and HgO cathodes and should assure that HgO is an ideal material for providing additional end-of-life warning in Li—AgO batteries.

In a preferred embodiment of the present invention used to power implantable devices, a cathode pellet is placed against each face of the separator/anode assembly. This assembly is then slipped into the case. The cover is then fusion welded to the case. The battery is then evacuated through the fill port and backfilled with a suitable electrolyte.

The electrolyte of the present invention is made from at least one non-aqueous aprotic organic solvent and one salt which dissolves in the solvent to make it ionically conductive. Both the solvent and the salt must be reasonably stable to reduction by the anode and oxidation by the cathode. Higher electrolyte conductivities are generally obtained by mixing two or more solvents together and by optimizing the salt concentration. Small amounts of corrosion inhibitors, such as lithium nitrate, can be mixed into the electrolyte to reduce the rate at which the stainless steel components corrode.

After obtaining the desired electrolyte fill volume, the fill tube is welded shut. The battery may then be exposed to a heat treatment and predischarge regimen before it is tested for acceptability.

Lithium-silver (II) oxide batteries of the present invention have an open circuit voltage comparable to those of other lithium batteries which use an organic electrolyte. They also have amp-hr capacities comparable to those obtained with the zinc-silver (II) oxide battery using an aqueous electrolyte. This provides the lithium-silver (II) oxide battery of the present invention with packaged volumetric and gravimetric energy densities about twice that obtainable from other high energy density active primary batteries.

Lithium-silver (II) oxide batteries of the present invention are capable of discharging over a reasonable temperature range and under low to moderate current densities. This should allow them to replace the lithium-iodine battery, as the power source of choice, in low power implantable devices such as pacemakers. This should also allow the lithium-silver (II) oxide battery of the present invention to become favored for powering many other devices including implantable devices which require more power than pacemakers (i.e., neurostimulators and drug pumps), as well as electronic watches with illuminated faces and other devices requiring moderate current densities.

Other details, objects and advantages of the present invention will become apparent as the following description of the presently preferred embodiments and presently preferred methods of practicing the invention proceed.

BRIEF DESCRIPTION OF THE DRAWINGS

In the accompanying drawings, preferred embodiments and methods of practicing the invention are illustrated in which.

DETAILED DESCRIPTION OF THE INVENTION

Figure 1:
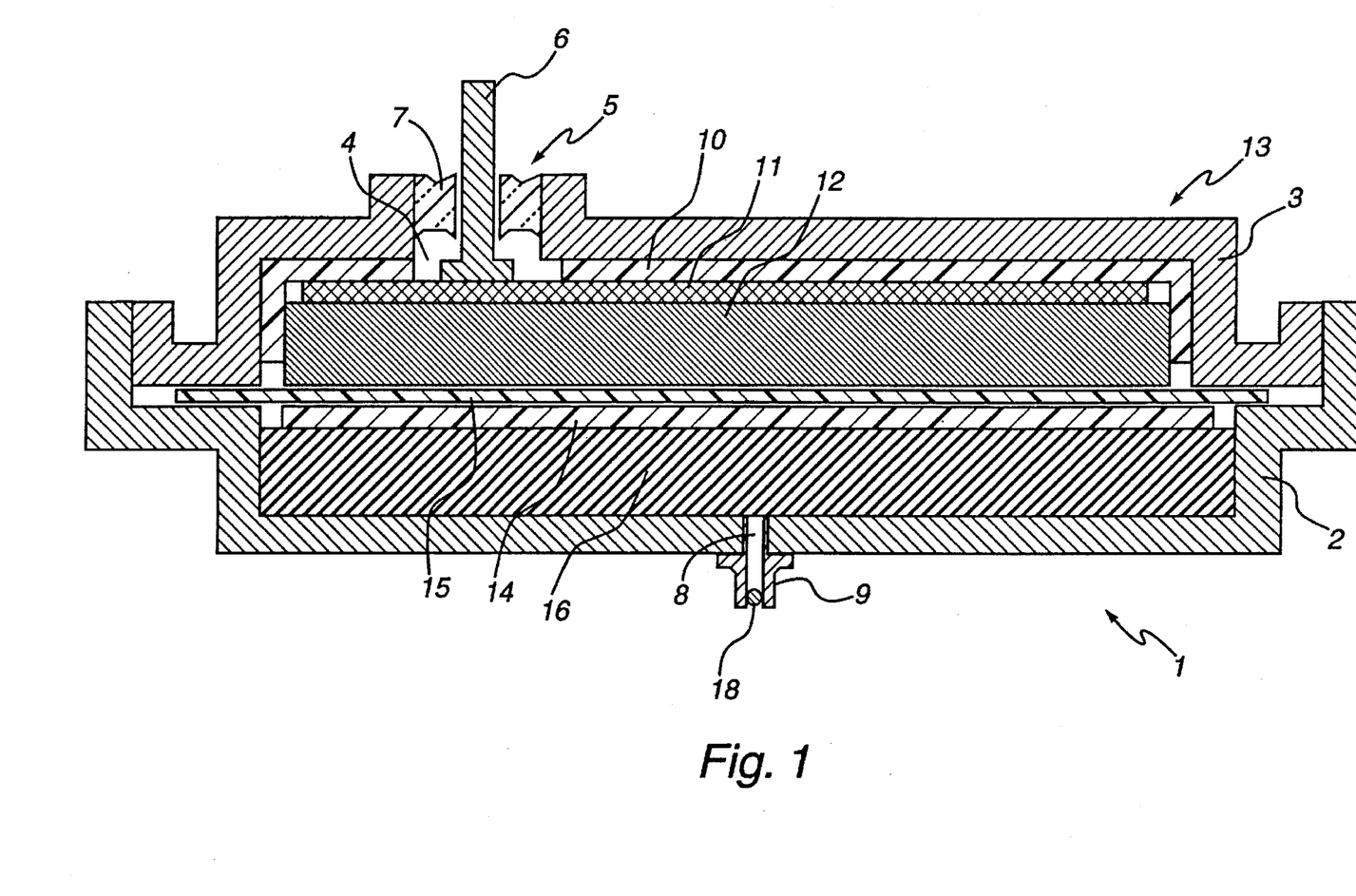
FIG. 1 is a cross sectional view of one embodiment of a lithium-silver (II) oxide battery of the present invention.

A preferred embodiment of the lithium-silver (II) oxide battery or cell of the present invention is shown in FIG. 1. The cell 1 has a case 2 and a cover blank 3 both preferably made of an Austenitic stainless steel such as 304L stainless steel. The cover blank 3 has a small hole 4 which allows a glass-to-metal seal 5 to be fused to the cover blank 3. The glass-to-metal seal 5 contains a metal feedthrough pin 6 which is preferably made of 446 stainless steel. The feedthrough pin 6 is surrounded and held in place by an insulator 7 which is preferably made of Fusite 435 glass but can be made from other glasses which are resistant to attack by lithium ions such as TA-23 and CABAL glass.

Fusite 435 glass is preferred in implantable applications because it can be fused to a 446 stainless steel pin 6, whereas the TA-23 and CABAL glasses require use of molybdenum feedthrough pins which are difficult to weld. The Fusite 435 glass is bonded to the cover blank 3 and feedthrough pin 6 in a manner assuring that the area of the glass-to-metal seal 5 is hermetically sealed. The case 2 also contains a hole 8 to which a fill tube 9, preferably made of an Austenitic stainless steel such as 304L stainless steel, is fusion welded.

During assembly of the cell 1, a cup shaped plastic insulator 10, preferably made of Halar™ or other stable plastic, is placed over the inside of the cover blank 3 in such a manner that the hole in the plastic insulator 10 does not cover the feedthrough pin 6. An expanded metal screen 11, preferably made of an Austenitic stainless steel such as 304L stainless steel, is then spot welded through the hole in the plastic insulator 10 to the feedthrough pin 6. In a low humidity environment, such as a dry room, a lithium disk 12 is then placed over and swaged to the expanded metal screen 11.

The plastic insulator 10 keeps the expanded metal screen 11 and the lithium disk 12 electrically insulated from the cover blank 3 but allows the expanded metal screen 11 to be spot welded to the feedthrough pin 6. Because the lithium disk 12 is swaged to the expanded metal screen 11 the feedthrough pin 6 is maintained in electrical contact with, and at the same potential as the lithium disk 12. Together, the cover blank 3, the glass-to-metal seal 5, the plastic insulator 10, the expanded metal screen 11, and the lithium disk 12 are referred to as the anode assembly 13.

After the anode assembly 13 has been completed a first separator disk 14, and preferably an additional separator disk 15, are placed over the lithium disk 12. The separator disks 14 and/or 15 should have a larger diameter than the lithium disk 12 and extend beyond the plastic insulator 10 covering a portion of the inside perimeter of the cover blank 3. This increases the path length which chemical species dissolved and/or suspended in the electrolyte must travel in order to migrate around the separator disks 14 and/or 15, and therefore, makes this process more difficult. It also allows the separator disks 14 and/or 15 to be bonded to the cover blank 3, preferably by heat sealing. This eliminates the migration of dissolved and/or suspended chemical species around the perimeter of the separator disks 14 and/or 15. This is important because any chemical species, such as $Ag^{+2}$ and/or AgO, in the electrolyte could otherwise migrate around the separators 14 and/or 15 and increase self discharge rates and/or cause the formation of a passivating layer on the surface of the lithium disk 12.

The separator disks 14 and/or 15 must be made from materials which are stable in the cell 1. This means that the separator disks 14 and 15 must not be reduced by the lithium disk 12, must not be oxidized by the cathode pellet 16, and must not react with the electrolyte 17. The separator disks 14 and 15 must also be electronic insulators, wettable by the electrolyte 17, and capable of minimizing the migration of dissolved and/or suspended species, such as $Ag^{+2}$ and/or AgO, through the separator while allowing for the transport of lithium ions.

These requirements may be relaxed, somewhat, when the separator consists of two or more layers. For example, if a first separator disk 14 is adjacent to the lithium disk 12, and a second separator disk 15 is separated from the lithium disk 12 by the first separator disk 14, then the second separator disk 15 need not be resistant to reduction by the lithium disk 12.

These requirements can be largely met if the separator disks 14 and 15 are made from microporous materials such as polypropylene, polyethylene, or fluoropolymers such as copolymers of ethylene and tetrafluoroethylene. These microporous materials are available in rolls with film thicknesses starting at about 1 mil. Microporous materials with pore sizes of about 0.2 micron and less are preferred. Microporous materials with average pore diameters as small as 0.05 microns, and even smaller, are available.

In general, a thinner membrane is preferable because it takes up less space in the cell 1 and has a lower resistance to the transport of lithium ions. Thicker materials are more effective at blocking the transport of chemical species, such as suspended AgO; however, this may significantly impact on the transport rate of lithium ions. Smaller pores are preferred because they are more effective at blocking the transport of large species, such as suspended AgO, without significantly impacting the transport of the smaller lithium ions.

Preferred microporous materials for fabrication of the separators 14 and/or 15 include Scimat 200/40/60 which has pores on the order of 0.2 microns and Celgard 2400 and 2456 which have pores on the order of 0.05 microns. Hoechst Celanese also makes Celgard K273 which has pores on the order of 0.03 microns. Although this material has not been sampled it should work better than Celgard 2400.

Another class of membranes, referred to as semi-permeable membranes may also be used, instead of microporous membranes, as separator disks 14 and/or 15 if the migration of chemical species, such as $Ag^{+2}$ and/or AgO, is not sufficiently blocked by the microporous membranes. The semi-permeable membranes may be fabricated from a sacrificial material, such as cellophane, which reacts with and reduces the incoming AgO and, therefore, keeps it from migrating to the anode disk 12. Millipore Corporation makes semi-permeable cellophane membranes with pores much smaller than 0.03 microns. The combination of properties available with these semi-permeable membranes could allow them to be particularly preferred separators when used alone, or with microporous separators.

An alternate approach to optimizing the performance of the separator layer is to tailor its characteristics to a particular application. For example, for powering implantable pulse generators only low power is necessary. Therefore, the first separator disk 14 could be made of one of the preferred microporous materials. The second separator disk 15 could be made of a thin non-porous plastic with a few small holes punched through the face at intervals. This arrangement would reduce power capability while reducing the rate at which colloidal species migrate through the separator assembly; however, this could be a particularly preferred separator embodiment for use in low power applications.

The cathode pellet 16, preferably pressed from 99% thermally stabilized AgO and 1% PTFE powder, is then inserted into the bottom of the case 2. The anode assembly 13, which has been covered by the separator disks 14 and 15, is then placed over the cathode pellet 16 in a fashion which allows the outer perimeter of the cover blank 3 to fit around the inner perimeter of the case 2. The perimeter of the cover blank 3 is then, preferably, fusion welded to the perimeter of the case 2 in a manner which allows the weld to be hermetic.

Because AgO is such a strong oxidizing agent and is known to oxidize so many organic compounds it was unexpected when it was found that AgO is more stable in certain organic electrolytes than in aqueous KOH. It is preferable to use thermally stabilized AgO in the cathode pellet 16 ensures that after long periods of storage and/or after long periods of low rate discharge significant amounts of the AgO have not been chemically decomposed into $Ag_2O$ or other materials which do not have the energy density of AgO.

Thermally stabilized AgO may be made by reducing the surface of the AgO to $Ag_2O$ and/or Ag. It may also be obtained by electrochemically oxidizing silver metal to AgO at high temperatures. Inorganic additives, including Pb and mixtures of Cd, Te, and Tl have also been reported to stabilize AgO.

For optimum performance, the purity, surface area, and density of the AgO should be considered. For example, thermally stabilized AgO should be as pure as possible thereby maximizing available energy density. This also minimizes impurities, such as transition metals, which are known to reduce the stability of AgO. The surface area of the AgO particles should be high enough to allow for low cathode polarization under load but not so high that it leads to unnecessary AgO decomposition. The AgO structure should also allow for the formation of a satisfactorily dense cathode pellet 16 without the use of excessive pelletization pressures.

The fill tube 9 is then connected to a vacuum and the cell 1 is evacuated of gas. The cell 1 is then backfilled with the electrolyte 17 until most, or all, of the void volume, including the void volume in the cathode pellet 16 and the separators 14 and 15, are filled with the electrolyte. A preferred electrolyte is 1.0M $LiAsF_6$ in tetrahydrofuran.

AgO has been found to slowly oxidize tetrahydrofuran to gamma-butyrolactone in the cell 1. The rate of this reaction appears to slow down with time; however, and the use of a tetrahydrofuran based electrolyte with small amounts of gamma-butyrolactone generated in the cell 1 does not appear to be a problem. Gamma-butyrolactone is not stable in the cell environment, however, and cannot be used alone as an electrolyte solvent in the cell. Alpha-methyl gamma-butyrolactone is also not stable in the cell environment and cannot be used alone as an electrolyte solvent in the cell.

Another electrolyte which is preferred for use in lithium-silver (II) oxide cells is 0.5M $LiAsF_6$ in 2-methyl-tetrahydrofuran. Other electrolytes which have been used include 1M $LiAsF_6$ in propylene carbonate and 1M $LiAsF_6$ in 3-methyl-2-oxazolidinone. Addition of about 5% ethylene carbonate to the electrolyte should improve the power capability of the lithium-silver (II) oxide battery. Other electrolyte salts which could be used include $LiClO_4$, $LiCF_3SO_3$, and $LiPF_6$.

It is preferable that all electrolyte components be as chemically pure as possible. This is because impurities, such as water, can react with the anode forming a passivating film on the lithium disk 12. Other impurities, such as transition metals, can destabilize the AgO in the cathode pellet 16. The electrolyte solvent may be purified by distillation and, if necessary, kept dry with molecular sieve. $LiAsF_6$, a preferred electrolyte salt, is available dry and with very high purity. It may be kept dry by maintaining it under a vacuum. A corrosion inhibitor, such as about 50 to 500 ppm by weight $LiNO_3$, may be added to the electrolyte to reduce the corrosion rate of the stainless steel components.

Solid polymer electrolytes for use in lithium batteries are known. These electrolytes are made from conventional liquid electrolytes which have been immobilized within a polymer matrix. This should greatly reduce the mobility of colloidal species and should optimize the shelf life of a lithium-silver (II) oxide battery.

Once the cell is filled with electrolyte, a metal ball 18, preferably made of an Austenitic stainless steel such as 304L stainless steel, is then pushed into the fill tube 8 effecting a temporary seal. This keeps the electrolyte 17 away from the fill tube 8 while it is welded closed. When the fill tube 8 is welded closed the battery becomes hermetically sealed. If desired the hermetically sealed battery may be preconditioned by exposing it to mild heat for several hours and/or a predischarge step.

Figure 2:
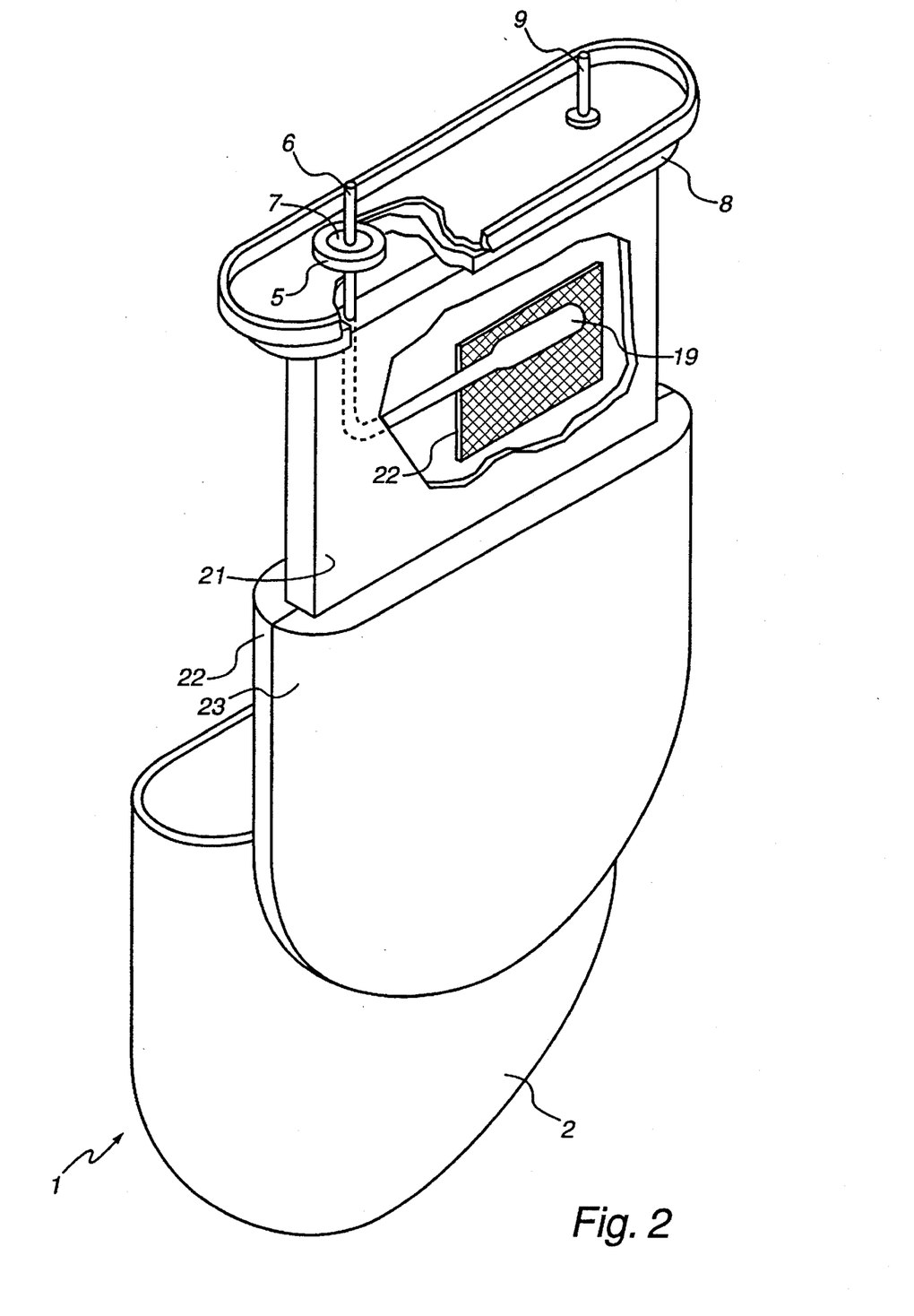
FIG. 2 is a cross sectional view of one embodiment of a lithium-silver (II) oxide cell of the present invention that might be used for implantable applications.

A preferred embodiment of the lithium-silver (II) oxide battery of the present invention, as envisioned for use in implantable applications, is shown in FIG. 2. The battery or cell 1 has a metal case 2 and a cover blank 3 both preferably made of 304L stainless steel. The cover blank 3 has a small hole which allows a glass-to-metal seal 5 to be fused to the cover blank 3. The glass-to-metal seal 5 contains a metal feedthrough pin 6 which is preferably made of 446 stainless steel. The feedthrough pin 6 is surrounded and held in place by an insulator 7 which is preferably made of Fusite 435 glass. A fill tube 9, preferably made of 304L stainless steel, is laser or projection welded over a small hole in the cover blank 3.

During assembly of the cell 1, the small hole in the plastic insulator 7, which is preferably made of Halar, is slipped over the feedthrough pin 6. The plastic insulator 7 is then pushed up to the bottom of, and aligned with, the cover blank 3. The end of the feedthrough pin 6 is then bent 90° and flattened. An expanded metal screen 19, preferably made of 304L stainless steel, is then spot welded to the feedthrough pin 6. A piece of lithium foil is then placed on either side of the expanded metal screen 19. The lithium foil is then swaged to the expanded metal screen 19 and cut to size creating the lithium anode 10.

Separator material can then be wrapped around the lithium anode 20 in a manner ensuring that the entire lithium anode 20 is covered by at least one layer of the separator 21. Preferably, however, an oversized sheet of separator material is placed over each face of the lithium anode 20 and then sealed around the perimeter of the lithium anode 20 forming the separator 21. Additional separator layers, as necessary, can be placed around the lithium anode 20 to optimize performance.

The cathode pellets 22 and 23, preferably formed from about 95–99% thermally stabilized AgO and about 1–5% PTFE powder are then placed around each face of the separator 21. The heat seal of the separator 21 may extend between the cathode pellets 22 and 23. This entire anode/separator/cathode assembly is then slipped into the case 2. The perimeter of the cover blank 3 is then welded, preferably by laser, to the case 2 in a manner providing a hermetic weld.

The fill tube 9 is then connected to a vacuum and the cell 1 is evacuated of gas. The cell 1 is then backfilled with electrolyte until most, or all, of the void volume in the cell 1 is filled with electrolyte. A metal ball is then pushed into the fill tube 9 effecting a temporary seal. This keeps electrolyte away from the fill tube 9 while it is welded closed. When the fill tube 9 is welded closed the battery becomes hermetically sealed. If desired, the hermetically sealed battery may be preconditioned by exposing it to mild heat for several hours and/or a predischarge step. Also, a single interface cell could be designed in a package of this shape.

In an initial experiment conducted in a dry room maintained at room temperature a 0.85 inch diameter cathode pellet weighing 1.00 grams was pressed from AgO with no additives and placed in a glass jar. Next, an anode disk with a thickness of 0.035 inches and a diameter of 0.81 inches was placed close to, but not contacting, the cathode pellet. The glass jar was then filled with electrolyte consisting of 0.5M $LiAsF_6$ dissolved in 2-methyl-tetrahydrofuran. A lid was then placed over the glass jar in a manner insuring that the electrode leads did not short.

Figure 3:
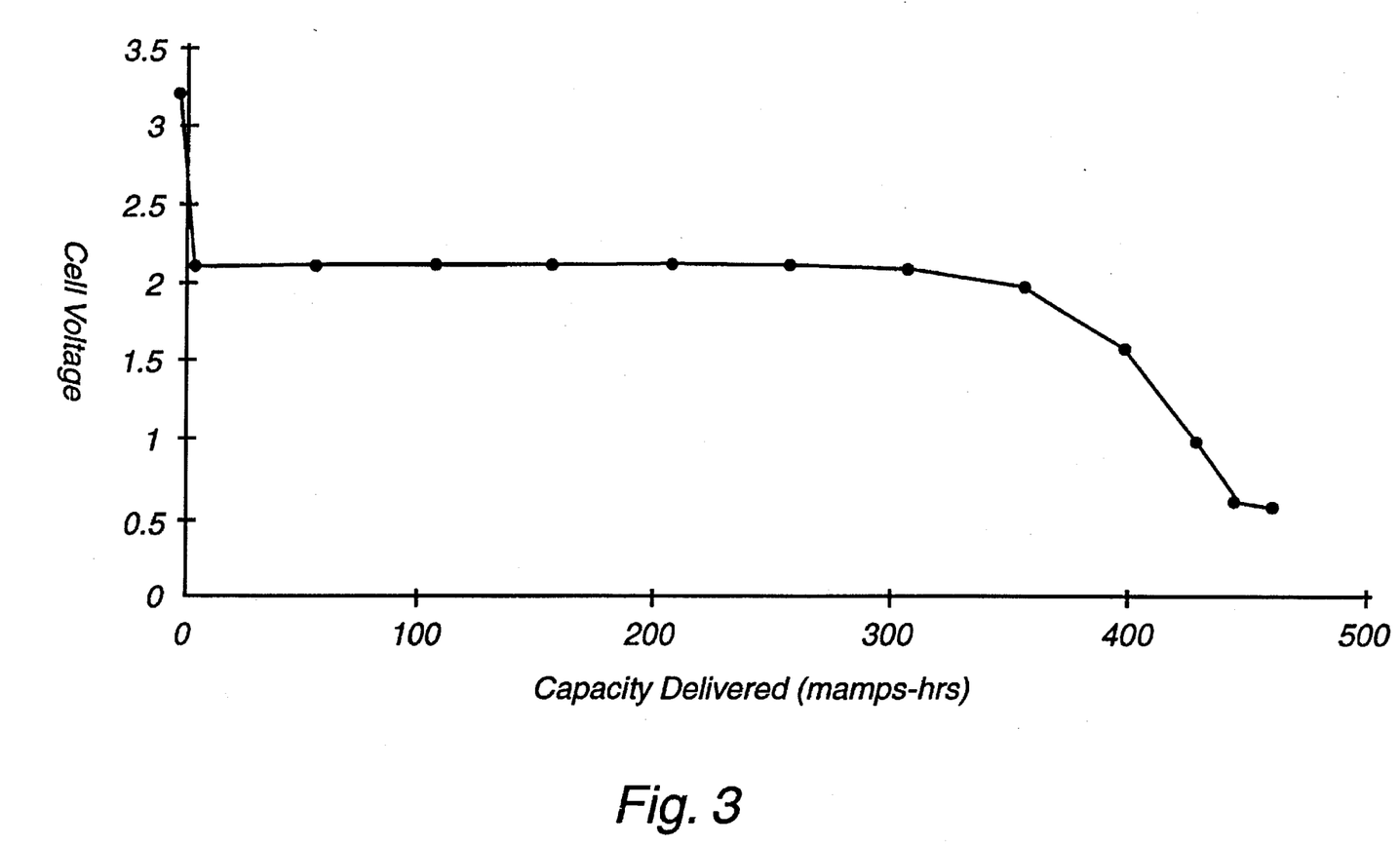
FIG. 3 is a discharge curve of a lithium-silver (II) oxide battery under a 1.00 kΩ load at room temperature showing complete discharge of the AgO cathode to Ag.

A 1.00 kΩ resister was then placed between the leads and the data that was collected was used to generate FIG. 3. FIG. 3 shows that the battery started discharging at about 3.2 volts but quickly stabilized at a loaded voltage of 2.1 volts. The battery maintained this voltage, while passing almost 4 mamps/in$^2$, for most of its life. The battery voltage then gradually declined. Assuming the AgO pellet was pure, and complete reduction to Ag, the battery had a cathode limited capacity of 433 mamp-hrs. Therefore, FIG. 3 shows that the AgO cathode discharged with 75% efficiency to a 2.0 volt cutoff and to 92% efficiency to a 1.5 volt cutoff. Capacity obtained beyond 433 mamp-hrs, at about 0.5 volts, was probably due to electrolyte reduction. Elemental analysis was performed to confirm that the AgO was reduced stoichio-metrically to silver metal.

Additional experiments were performed in a package similar to that shown in FIG. 1. In these experiments 1.5 gram cathodes containing 99% by weight AgO, obtained from AESAR/Johnson Matthey, and 1% Teflon™ 7A PTFE powder, obtained from Dupont, were pressed into battery cans similar to those shown in FIG. 1. Since these cans did not have fill tubes, 0.35 cc of 1.0M $LiAsF_6$ in tetrahydrofuran was placed over the cathodes with a syringe. After the cathode absorbed the electrolyte a disk of Whatman GF/A glass fiber was placed over the cathode pellets. A microporous fluoropolymer disk of Scimat 200/40/60, large enough in diameter to fit between the lip of the case and cover of the cell, as shown in FIG. 1, was then placed over the GF/A disk. An anode cover assembly was then placed over the separator and the cells were welded shut.

These cells had excess lithium and a theoretical cathode limited capacity of 643 mamp-hrs. A group of eight cells from this lot of batteries were discharged under a 10.0 kΩ load at 25° C. Although a plot of the data is not shown but the cells delivered a median of 560 mamp-hrs or 87% of their theoretical capacity, to a 2.0 volt cutoff.

Figure 4:
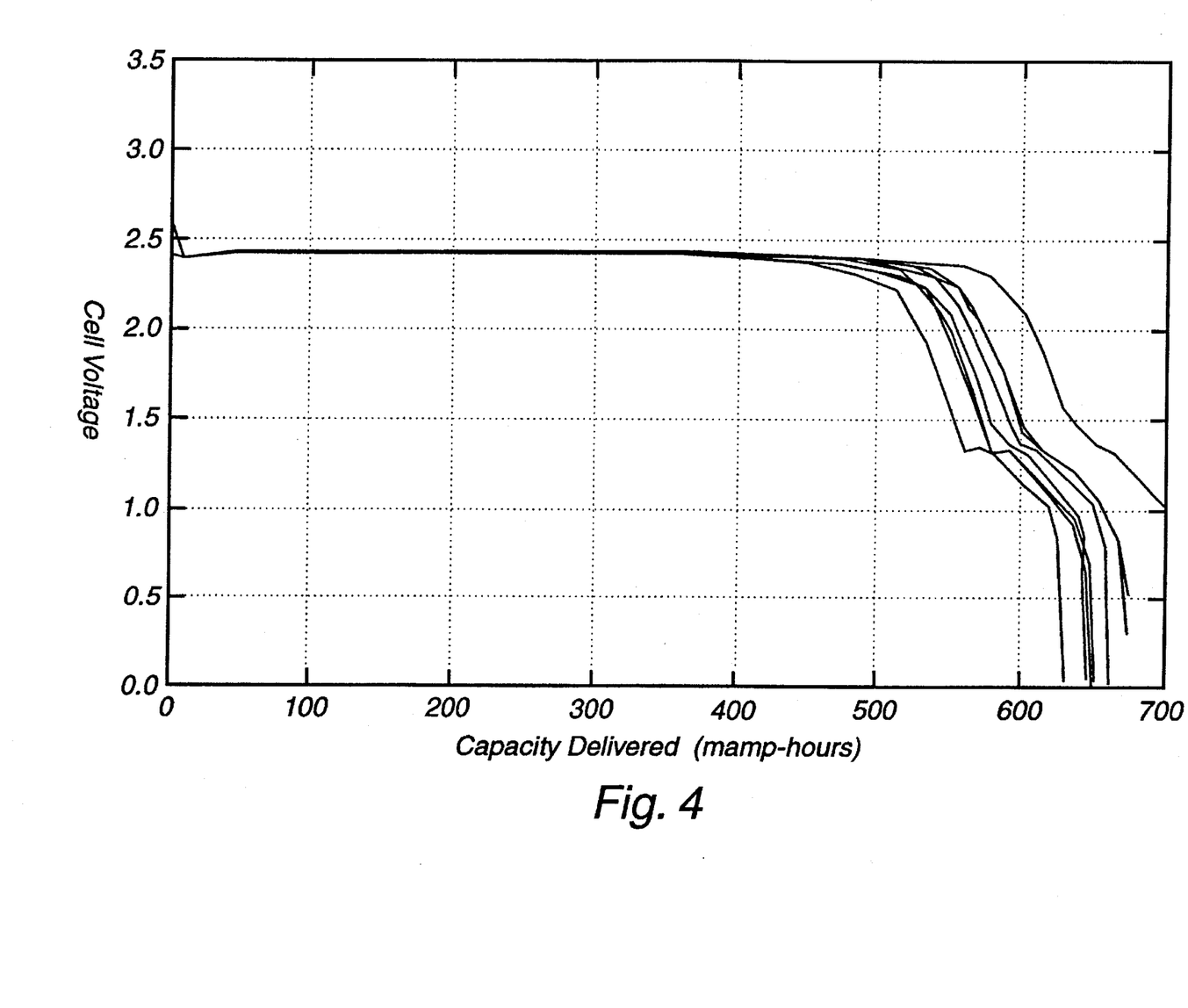
FIG. 4 is the discharge curve of several lithium-silver (II) oxide batteries under 20.0 kΩ loads at 25° C.
Figure 5:
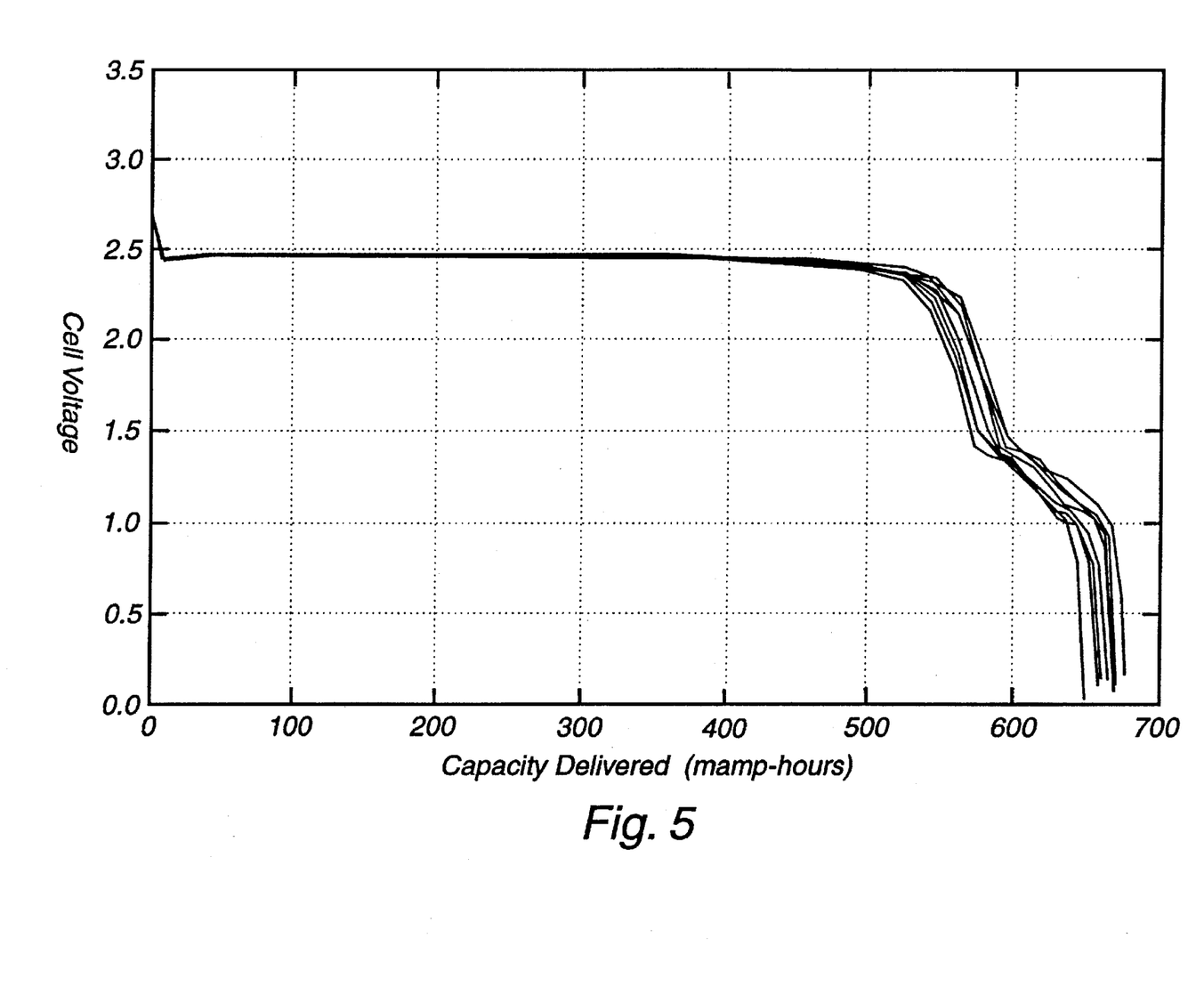
FIG. 5 is the discharge curve of several lithium-silver (II) oxide batteries under 20.0 kΩ loads at 37° C.
Figure 6:
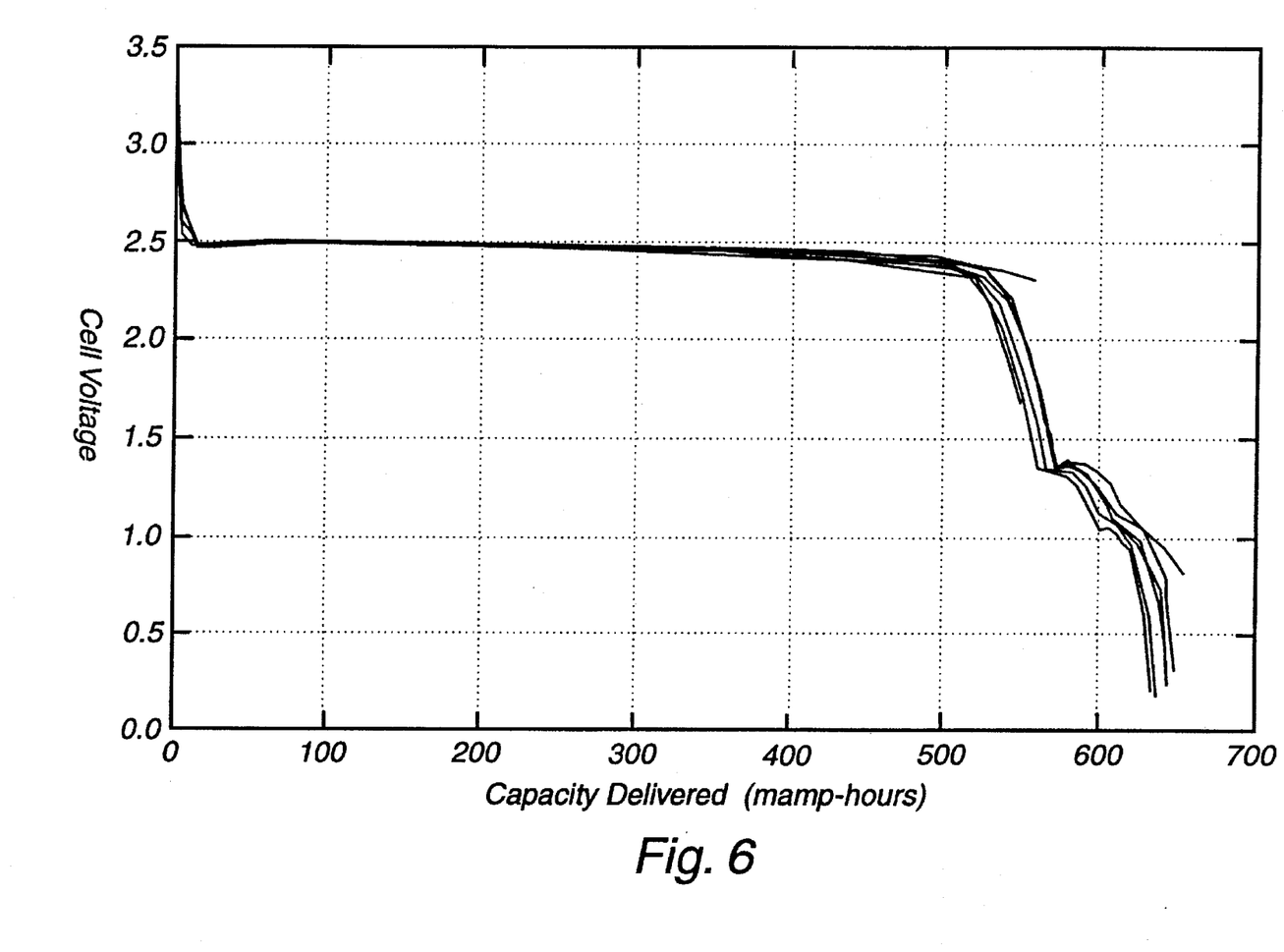
FIG. 6 is the discharge curve of several lithium-silver (II) oxide batteries under 50.0 kΩ loads at 37° C.

FIG. 4 shows that a group of eight cells from this lot of batteries discharged under a 20 kΩ load at 25° C. delivered a median of 564 mamp-hrs or 88% of their theoretical capacity, to a 2.0 volt cutoff. FIG. 5 shows that a group of eight cells from this lot of batteries discharged under a 20 kΩ load at 37° C. delivered a median of 562 mamp-hrs or 87% of their theoretical capacity to a 2.0 volt cutoff. FIG. 6 shows that a group of eight cells from this lot of batteries discharged under a 50.0 kΩ load at 37° C. delivered a median of 546 mamp-hrs or 85% of their theoretical capacity, to a 2.0 volt cutoff. This corresponds to about a 3% capacity loss per year at 37° C.

In further experiments, 1.5 grams of cathode material, consisting of 99% AgO and 1% PTFE, and 0.35 cc of 1.0M LiAsF$_6$ in tetrahydrofuran were put in cell packages similar to that shown in FIG. 1. No plastic insulator cup, anode screen, anode, separator, or fill tube was provided in the package used in this experiment. One group of half cells was made with standard AgO obtained from AESAR/Johnson Matthey and the other group of half cells were made with thermally stabilized AgO. Representative microcalorimetry data showed 13 microwatts of heat from a package with the standard AgO and 5 microwatts of heat from a package with thermally stabilized AgO.

In a package similar to that shown in FIG. 1, cells with 1.5–2.0 grams of cathode material, consisting of 99% non-thermally stabilized AESAR/Johnson Matthey AgO and 1% PTFE with 1.0M LiAsF$_6$ in tetrahydrofuran electrolyte and Scimat 200/40/60 separator were made as control cells. The test group were identical except they had cathodes made from thermally stabilized AgO. Microcalorimetry data for the control cells showed 60–100 microwatts of heat at 37° C. for undischarged cells. The test group of cells with the thermally stabilized AgO showed 20–40 microwatts under the same conditions.

Discharge of the cells containing the 2.0 grams of thermally stabilized AgO at 37° C. under a 5.0 k$\Omega$ load yielded 700–725 mamp-hrs to a 2.0 volt cutoff. These discharge characteristics were similar to those obtained from the cells with 2.0 grams of non-thermally stabilized AgO except that a few percent less capacity was obtained from these cells. This was consistent with the greater purity of the thermally stabilized AgO shown by thermogravimetric analysis.

Undischarged samples of cells from both groups with 2.0 gram cathodes were placed at 50° C. for three months. The room temperature 1,000 Hertz impedance data obtained on these cells before and after storage follows:

| Cathode Type | Initial Impedance | Impedance after Storage |
| --- | --- | --- |
| non-stabilized | 24 ohms | 974 ohms |
| non-stabilized | 25 | 2,800 |
| non-stabilized | 30 | 1,900 |
| non-stabilized | 27 | 3,200 |
| non-stabilized | 27 | 2,060 |
| stabilized | 32 | 700 |
| stabilized | 29 | 730 |
| stabilized | 29 | 815 |
| stabilized | 26 | 602 |
| stabilized | 28 | 953 |

Figure 7:
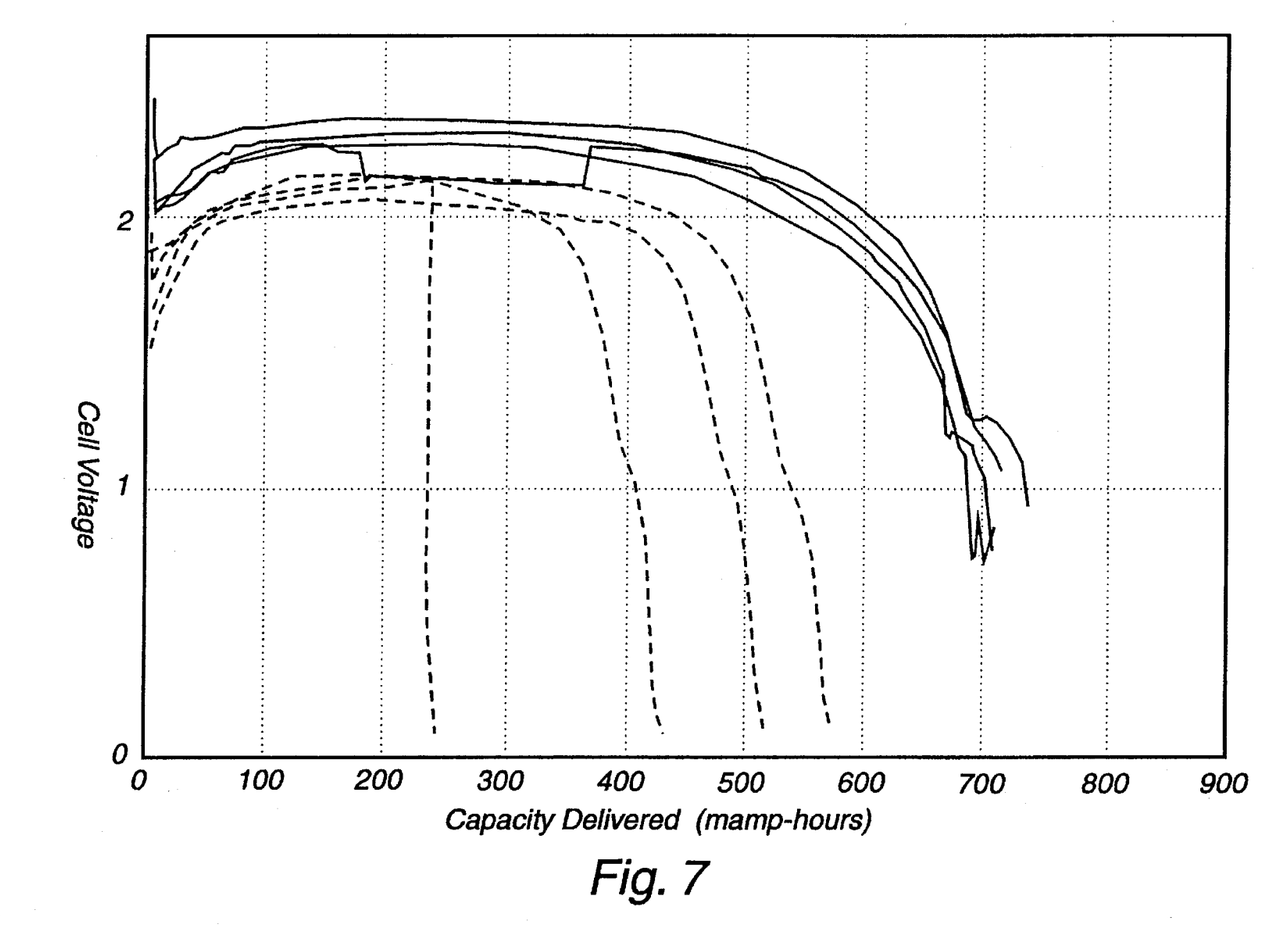
FIG. 7 is the discharge curve of several lithium-silver (II) oxide batteries under 5.0 kΩ loads with and without thermally stabilized AgO after storage for three months at 50° C.

The performance of the two groups of cells under a 5.0 k$\Omega$ load at 37° C., after completion of the storage regimen, is shown in FIG. 7. The group with the thermally stabilized AgO cathodes (shown by the solid lines) discharges with higher voltage and less capacity loss than the group with non-thermally stabilized AgO (shown by the dotted lines). Destructive analysis of cells confirms that this is due to a much thinner passivation layer on the anodes of cells made with thermally stabilized AgO than on cells made with non-thermally stabilized AgO.

Chemical analysis of the passivation layer suggests it consists of a blocking layer of metallic silver and lithium oxide which is formed after silver species migrate to the anode. Therefore, maximizing the shelf life of a lithium-silver (II) oxide battery requires use of thermally stabilized silver oxide and minimizing the rate at which silver species migrate to the anode. Since the discharge reaction competes with the self discharge reaction, the rate at which silver species migrate to the anode can also be reduced by placing a load around a lithium-silver (II) oxide battery.

Microcalorimetry, AC impedance, visual analysis of cell components, chemical analysis of cell components, and discharge data all suggest that use of thermally stabilized AgO reduces self discharge and the rate at which the passivating layer forms in lithium-silver (II) oxide batteries. Therefore, use of thermally stabilized AgO is preferred over non-thermally stabilized AgO. Use of a separator with smaller pores than those existing within the Scimat 200/40/60 separator or a solid polymer electrolyte should also further improve shelf life.

Figure 8:
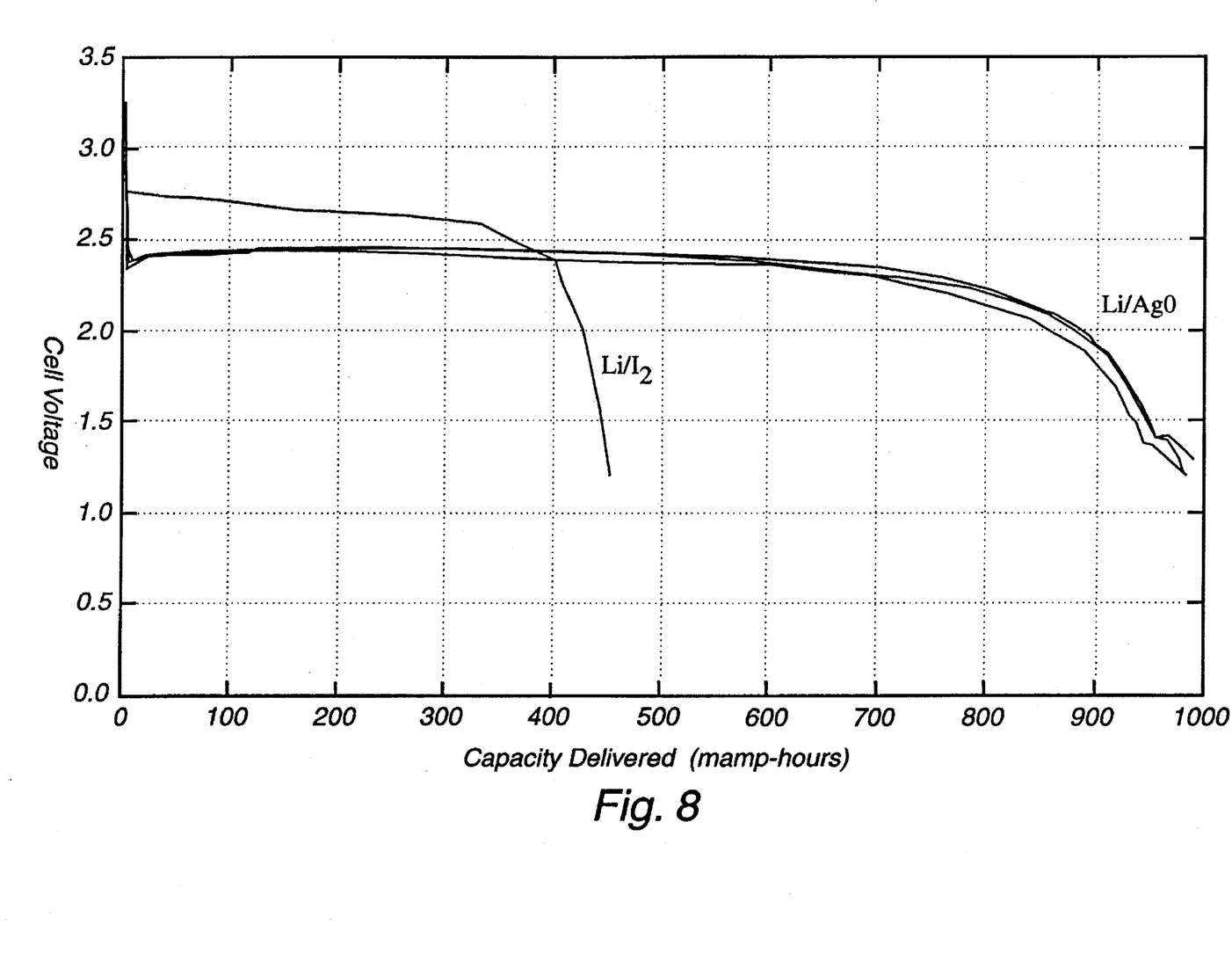
FIG. 8 compares the capacity obtained from a lithium-iodine battery discharged under a 120 kΩ load at 25° C. with the capacity obtained from a lithium-silver (II) oxide battery discharged under a 5.0 kΩ load at 37° C. in packages similar to the one shown in FIG. 1.

Shown in FIG. 8 is a discharge curve for a lithium-iodine battery in a package similar to that shown in FIG. 1. This curve was generated under a 120 k$\Omega$ load at 25° C. which provides for optimum efficiency for the lithium-iodine chemistry. To a 2.0 volt cutoff under these conditions the lithium-iodine cell produces about 430 mamp-hrs.

Also, shown in FIG. 8, is the discharge curve for three lithium-silver (II) oxide batteries in the same package under 5.0 k$\Omega$ loads at 37° C. These cells contained lithium anodes with a diameter of 0.81 inches, a thickness of 0.068 inches, and a weight of 0.399 grams. They therefore had a theoretical anode capacity of 1.307 amp-hrs. The cathodes were 0.85 inches in diameter, 0.035 inches thick, 2.27 grams in weight and had a porosity of 5%. They consisted of 99% thermally stabilized AgO and 1% Teflon™7A PTFE powder obtained from Dupont. The theoretical cathode capacity was therefore 973 mamp-hrs. These cells were filled with 1.0M LiAsF$_6$ in tetrahydrofuran through a fill tube. The separator used was Scimat 200/40/60, large enough in diameter to fit between the lip of the case and cover of the cell.

The data obtained during the discharge of the median lithium-silver (II) oxide battery shows that 884 mamp-hrs or 91% of the cathode capacity was obtained to a 2.0 volt cutoff. Therefore, under the conditions described, the lithium-silver (II) oxide battery produced 2.06 times more capacity than the lithium-iodine battery described.

While presently preferred embodiments of practicing the invention have been shown and described with particularity in connection with the accompanying drawings, the invention may be otherwise embodied within the scope of the following claims.

What is claimed is:

1. A battery comprising a housing; a lithium anode; a thermally stabilized silver II oxide cathode; an aprotic organic electrolyte which is stable to reduction by the anode and oxidation by the cathode; and a separator which maintains the anode electrically separate form the cathode but allows for ionic transport between the anode and cathode.

2. The battery of claim 1 wherein the cathode further comprises a binder of from about 1 to 10% by weight.

3. The battery of claim 1 wherein the cathode further comprises a conductive additive from about 1 to 10% by weight.

4. The battery of claim 1 wherein the cathode further comprises mercuric oxide mixed with the thermally stabilized silver (II) oxide.

5. The battery of claim 4 wherein the cathode comprises about 50 to 95% thermally stabilized silver (II) oxide with about 5 to 30% mercuric oxide by weight.

6. The battery of claim 1 wherein the aprotic organic electrolyte permits the efficient reduction of the cathode at drain rates of about 4 mamps/in$^2$.

7. The battery of claim 1 wherein the aprotic organic electrolyte is chosen from the group consisting of LiAsF$_6$ in 2-methyl-tetrahydrofuran, LiAsF$_6$ in tetrahydrofuran, LiAsF$_6$ in propylene carbonate, or LiAsF$_6$ in 3-methyl-2-oxazolidinone.

8. The battery of claim 1 wherein the aprotic organic electrolyte is $LiAsF_6$ in a mixture of any two or more of the solvents chosen from the group consisting of 2-methyl-tetrahydrofuran, tetrahydrofuran, propylene carbonate, and 3-methyl-2-oxazolidinone.

9. The battery of claim 1 wherein the aprotic organic electrolyte further comprises a corrosion inhibitor.

10. The battery of claim 1 wherein the separator seals around most of the anode essentially eliminating migration of chemical species around the separator.

11. The battery of claim 10 wherein the separator comprises more than one separator layer.

12. The battery of claim 10 wherein the separator comprises a microporous plastic with mean pore diameters of about 0.2 microns or less.

13. The battery of claim 10 wherein the separator comprises a solid polymer electrolyte capable of passing lithium ions.

14. The battery of claim 10 wherein the separator comprises a semi-permeable film.

15. The battery of claim 10 wherein the separator comprises a semi-permeable film.

16. The battery of claim 15 wherein the cathode comprises about 95 to 99% thermally stabilized silver (II) oxide.

17. The battery of claim 1 wherein the aprotic electrolyte is chosen from the group consisting of $LiClO_4$, $LiCF_3SO_3$ and $LiPF_6$ in a solvent chosen from the group consisting of 2-methyl-tetrahydrofuran, tetrahydrofuran, propylene carbonate and 3-methyl-2-oxazolidinone.

* * * * *